UNITED STATES PATENT OFFICE.

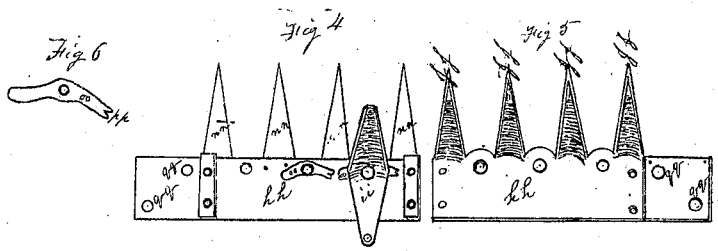

CYRENUS WHEELER, JR., OF POPLAR RIDGE, NEW YORK.

IMPROVEMENT IN GRAIN AND GRASS HARVESTERS.

Specification forming part of Letters Patent No. 12,044, dated December 5, 1854.

*To all whom it may concern:*

Be it known that I, CYRENUS WHEELER, Jr., of Poplar Ridge, in the town of Venice, county of Cayuga, and State of New York, have invented and made certain new and useful Improvements on a Machine for Harvesting Grain and Grass; and I do hereby declare that the following is a full and exact description of the construction and operation of the same, reference being had to the accompanying drawings, making part of this specification, in which—

Figure 1 is a perspective view of the machine; Fig. 2, of the arched bar and half of joint; Fig. 3, of socket, standard, quadrant, and corresponding half of joint; Figs. 4 and 5, longitudinal sections of cutter bar or arm with knife or cutter and spring; Fig. 6, cutter-spring; Fig. 7, perspective view of table or apron for holding the grain.

$a$, Fig. 1, are the side pieces of the frame, attached to the shaft $b$, Fig. 1, of the driving-wheel by boxes $c$, Fig. 1, in which the shaft revolves. The side pieces, $a$, Fig. 1, extend forward of the driving-wheel $d$, Fig. 1, sufficient distance to attach a tongue by a roller, $e$, Fig. 1, which admits of the tongue moving freely up or down, thereby enabling the machine to adjust itself freely to inequalities of the ground. The side pieces, $a$, Fig. 1, extend back from the driving-wheel sufficient distance to admit of a cross-piece, $f$, Fig. 1, and to give sufficient space for the caster-wheel $g$, Fig. 1, to move freely on its spindle $h$, Fig. 1, between the cross-piece and the connecting-rod $i$, Fig. 1.

$d$, Fig. 1, is the driving-wheel of the machine, which is firmly attached to the shaft $b$, Fig. 1.

$J$, Fig. 1, is a rim attached to the inside of the arms $k$, Fig. 1, of the driving-wheel $d$, Fig. 1, and having cogs $l$, Fig. 1, on its internal surface, which gear into a pinion, $m$, Fig. 1, which pinion is attached to a shaft, $n$, Fig. 1, on which is also fastened a face-wheel, $o$, Fig. 1, which face-wheel gears into the pinion $p$, Fig. 1, which pinion is firmly attached to the shaft $q$, Fig. 1, at one end, and at the other is attached a wheel, $r$, Fig. 1, in which is inserted a wrist, which serves as a crank. The shafts $n$ and $q$, Fig. 1, are supported by boxes attached to the frame-work in which they freely revolve.

$t$, Fig. 1, is a wheel of the same size as the driving-wheel, and is attached to the shaft $b$, Fig. 1, which projects sufficiently far through the side piece, $a$, Fig. 1, to admit of the wheels revolving freely outside of the frame-work. The wheel revolving freely on the shaft or its axle without interfering with the motion of the driving-wheel, while it serves to keep the machine in an upright position.

$u$, Fig. 1, is the driver's seat, elevated above the driving-wheel, and supported by its legs $v$, Fig. 1.

$w$, Fig. 1, is an arched bar passing over and on the outside of the hinder part of the side pieces of the frame $a$, Fig. 1, to which it is attached by bolts $x$, Fig. 1, passing through both and admitting of the top of the arch $w$, Fig. 1, being turned backward or forward, as on hinges or pivots, by the lever $y$, Fig. 1, which is firmly bolted to the top of the arch $w$, Fig. 1, and extends forward on the inside of the driving-wheel to the inside forward leg, $v$, Fig. 1, to which it is secured by a guide and pins.

$z$, Fig. 1, is a socket, with the half of a rule-joint, $a\,a$, Fig. 1, attached to its corresponding half at the end of the arched bar, $w$, Fig. 1, by a bolt passing through both.

$b\,b$, Fig. 1, is a quadrant attached firmly to the inner side of the socket $z$, Fig. 1, and passes by and close to a similar one, $c\,c$, Fig. 1, attached to the end side of the arched bar $w$, Fig. 1, thereby strengthening and supporting the joint $a\,a$, Fig. 1.

$d\,d$, Fig. 1, is a standard, firmly attached at its base or lower end to the socket $z$, Fig. 1, and at its upper end is perforated with a hole, to which is attached a chain or rope, $e\,e$, Fig. 1, which passes round the pulley $f\,f$, Fig. 1, on the top of the arched bar $w$, Fig. 1, and is carried forward to the lever $g\,g$, Fig. 1, which lever is attached at its lower end by a bolt to the middle piece, $s\,s$, Fig. 1, of the frame, admitting of the upper end of the lever being moved backward or forward.

$h\,h$, Fig. 1, is a cutter-bar, composed of an upper and lower portion, with sufficient space left between for the admission of the knives or cutters $i\,i$, Fig. 1, and a spring, $o\,o$, Fig. 4, between the knife or cutter and the bed-piece or lower half of the cutter-bar. (See $h\,h$, Fig. 4.)

$J\,J$, Fig. 1, are points of the stationary or upper portion of the cutter; $k\,k$, Fig. 1, bolts passing through both parts of the cutter-bar $h\,h$, Fig. 1, and through the knives or cutters $i\,i$, Fig. 1, and through the spring $o\,o$, Fig. 6, the knives or cutters $i\,i$, Fig. 1, moving on the bolts $k\,k$, Fig. 1, as on a pivot. The shanks of the cutters $i\,i$, Fig. 1, extend back of the bar $h\,h$, Fig. 1, far enough to admit of attaching the driving-rod $l\,l$, Fig. 1, to them by bolts or pins.

$i$, Fig. 1, is a connecting-rod, composed of two parts, with a screw admitting of its being lengthened or shortened at pleasure. One end of the rod is attached to the driving-rod $l\,l$, Fig. 1, by a joint, and the other to the crank or wrist $s$, Fig. 1.

$g$, Fig. 1, is a caster-wheel. $h$, Fig. 1, is a spindle and straps or legs which support the wheel, the spindle passing through the arm $r\,r$, Fig. 1, which arm is bolted at the other end firmly to the cross-piece $f$, Fig. 1.

Figs. 2 and 3 are detached views of the arm and socket. When united at $m\,m$, Figs. 2 and 3, by a bolt, a strong joint is made similar to a rule-joint, which admits of the outer end of the cutter-bar $h\,h$, Fig. 1, rising or falling with the inequalities of the ground when in use. The arch $w$, Fig. 2, is united to the hind part of the side pieces, $a$, Fig. 1, by bolts at $x$, Fig. 1, which admits of the top of the arch being rolled on the bolts backward or forward.

Figs. 4 and 5 are longitudinal sections of the cutter-bar, Fig. 4 being a representation of the upper surface of the under half or portion of the bar, and Fig. 5 the under part of the upper portion or half of the bar.

The points or stationary cutters $J\,J$, Fig. 5, are made concave on their under side for the purpose of giving a better fit to the cutting-edges of the movable cutters or knives $i\,i$, Fig. 4, which knives have a concave surface on their upper part from their point to a short distance back of the bolts on which they turn.

$n\,n$, Fig. 4, shows the upper portion on surface of the guards or braces, which guards are fastened to the under side of the under portion or half of the cutter-bar, and are curved upward and meet the points of the upper or stationary cutters, to which they are united by rivets or screws, sufficient space being left between the two for the free play of the movable cutters.

$o\,o$, Fig. 6, represents a curved spring of steel with a hole through the middle for the admission of the bolt on which the movable cutter turns. At one end of the spring $o\,o$, Fig. 6, is a slot, $p\,p$, Fig 6, which serves, by means of a pin in the lower part of the cutter-bar to keep the spring $o\,o$, Fig. 4, in position. The spring $o\,o$, Fig. 4, by its form and position under the movable cutter $i\,i$, Fig. 4, serves to press the upper or cutting edge firmly against the under surface of the upper portion of the cutter-bar $h\,h$, Fig. 5, and its stationary points or cutters $J\,J$, Fig. 5. The Figs. 4 and 5, when united at each end by bolts or rivets, sufficient space being left between the two for inserting the knives or cutter and spring, form the cutter-bar, which is firmly bolted to the socket $z$, Fig. 3, by bolts passing through the holes $q\,q$, Figs. 4 and 5, and corresponding holes $q\,q$ in the socket $z$, Fig. 3. The cutters $i\,i$, Fig. 4, are beveled from the upper edges downward and inward, making a sharp shear-edge on both sides. The upper or stationary cutters or points, $J\,J$, Figs. 1 and 5, are beveled upward and inward, so as to present a sharp corner for the movable cutter to operate against.

Fig. 7 is a representation of the table or apron for receiving the grain when cut, and bolts or fastens to the under side of the cutter-bar $h\,h$, Fig. 1. The cutter-bar $h\,h$, Fig. 1, is composed of two bars of iron of similar width and thickness, bolted or riveted together with their flat surfaces parallel to each other, a space being left between them by inserting blocks or pieces of metal, and the stationary cutters may be welded to the upper bar or fastened to it by rivets or bolts.

The wheel $t$, Fig. 1, being constructed partly of wood and partly of iron, or wholly of iron, and so fitted to the shaft as to play freely on on it as its axle without interfering with the motions of the driving-wheel, the face-wheel $o$, pinions $m$ and $p$, Fig. 1, should be of such size as, combined with the driving-wheel $d$, Fig. 1, will give from twenty-five to thirty revolutions of the crank or wrist $s$, Fig. 1, to one of the driving-wheel. The crank-shaft $g$, Fig. 1, should be of sufficient length to bring the crank or wrist $s$, Fig. 1, in direct line with the driving-rod $l\,l$, Fig. 1.

The arched bar $w$, Figs. 1 and 2, should be composed of iron. The ends of the arched bar $w$, Fig. 1, on its inside should be made straight and parallel to each other.

The spring is bent in a curved or arched form, $o\,o$, Fig. 6, so that the ends of the spring may rest on the lower part of the cutter-bar, $h\,h$, Fig. 4, and the center of the spring press against the under portion of the knife or cutter $i\,i$, Fig. 4.

I also fasten to the top of the arch $w$, Fig. 1, a lever, $y$, Fig. 1, of iron or wood, which extends forward and passes through a guide attached to the inside forward leg, $v$, Fig. 1, and is confined at any required height by pins passing through the guide and leg.

The caster-wheel $g$, Fig. 1, is composed of iron from ten to sixteen inches in diameter, with a rim from two to three inches wide, which is placed in a strong stand or legs, $f$, with a spindle, $h$, Fig. 1, attached, which spindle passes through an arm or socket, $r\,r$, Fig. 1.

The arm or socket $r\,r$, Fig. 1, is composed of iron of a curved form, and of sufficient length to admit the caster-wheel $g$, Fig. 1, playing freely on its spindle under it without interfering with the cross-piece $f$, Fig. 1, to which the arm is firmly bolted.

The apron or grain-table, Fig. 7, is composed of a light frame-work covered with boards, which may be made to correspond in length to the cutting portion of the cutter-bar $h\,h$, Fig. 1, and may be fastened to the cutter-bar, when desired, by bolts. The width of the table being made sufficient to catch the falling grain, which may be raked from it by a man riding on the machine.

The movable cutters $i\,i$, Fig. 1, by their position under the stationary points or cutters $jj$, Fig. 1, and by being firmly pressed against the corners or edges of them by the springs $oo$, Fig. 6, as they move to and fro on their bolts in the arc of a circle, cut freely and easily all grass or herbage coming between the points and cutters, the machine cutting equally well the coarsest or finest and softest grass, not being liable to clog or buff in thick, fine herbage, and cutting equally well at the fastest or slowest walk of the team, the arched bar and socket being supported and kept from pressing too hard upon the ground by the caster-wheel $g$, Fig. 1. The caster-wheel also, by its support, admits of the machine being turned short round, avoiding the necessity of backing the team in coming out and setting in at the corners of the standing grass. The cutter-bar $hh$, Fig. 1, in the movement of the machine forward, rises and falls freely on the joint $aa$, Fig. 1, adjusting itself to the inequalities of the ground. By the lever $y$, Fig. 1, attached to the arch $w$, Fig. 1, the driver can raise or depress the points of the cutters $ii$ and $jj$, Fig. 1, (the arch $w$, Fig. 1, turning on its bolts $x$, Fig. 1, as on a hinge,) for the purpose of cutting higher or lower or for the purpose of passing any obstructions met with without leaving his seat, and in like manner can by the aid of the perpendicular lever $gg$, Fig. 1, and its connections—the chain $ee$, Fig. 1, the pulley $ff$, Fig. 1, and the standard $dd$, Fig. 1—raise the outer end of the cutter-bar $hh$, Fig. 1, to any required height and sustain it there for the purpose of passing obstructions or for the convenience of moving from one field or place of operation to another.

Having thus fully described my improved machine, I would state that I do not claim the driving-wheel, face-wheel, or pinions, the boxes or shafts of the cam. Neither do I claim the connecting-rod of two parts, or the driving-bar, nor claim the double-edged movable pivoted cutters or shears as pivoted in the center and placed on the top of the stationary or fixed ones, or the cutter-bar as heretofore constructed by others. Neither do I claim the seat for the driver or the table for receiving the grain. I do not claim the caster-wheel as such alone; but

What I do claim as my invention, and desire to secure by Letters Patent, is—

The hanging the cutter-bar $hh$, provided for the purpose with a socket, $z$, to one extremity of the arched bar $w$ by means of joints $aa$ and segments $bbcc$, said arched bar being in its turn pivoted in $x$ to the main frame $aa$, all for the purpose of giving the cutter-bar $hh$, by means of levers $y$, $dd$, and $gg$, a motion independent of the frame, and both rotating longitudinally parallel to the ground and oscillating radially from the joints $aa$ in order to adapt the same to the inequalities of the ground, or to stop its action at pleasure, as described.

CYRENUS WHEELER, JR.

Witnesses:
ALLEN MOSHER,
GEORGE MOSHER.